Feb. 4, 1964     M. E. RUSSELL     3,120,110
VACUUM MILK COOLER
Filed Oct. 11, 1961     2 Sheets-Sheet 1
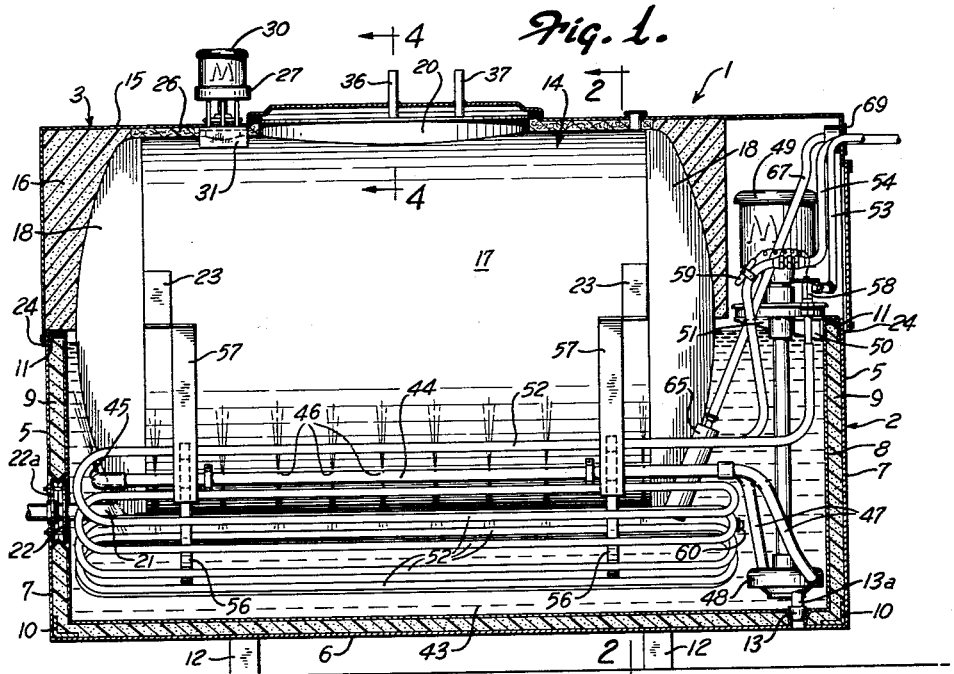
Fig. 1.
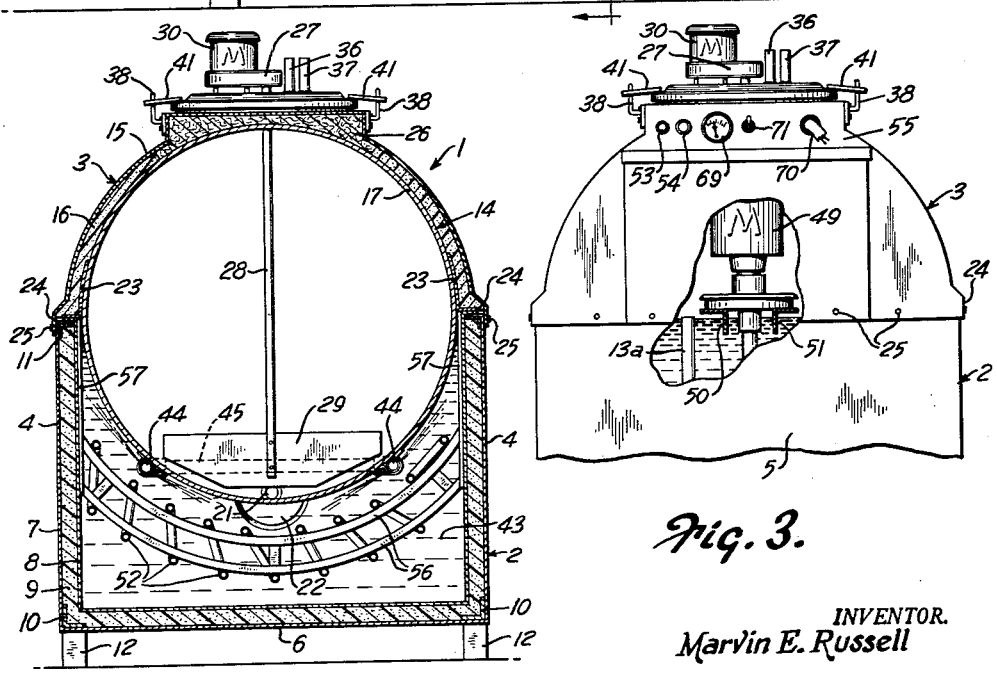
Fig. 2.
Fig. 3.
INVENTOR.
Marvin E. Russell
BY Andrus & Starke
Attorneys

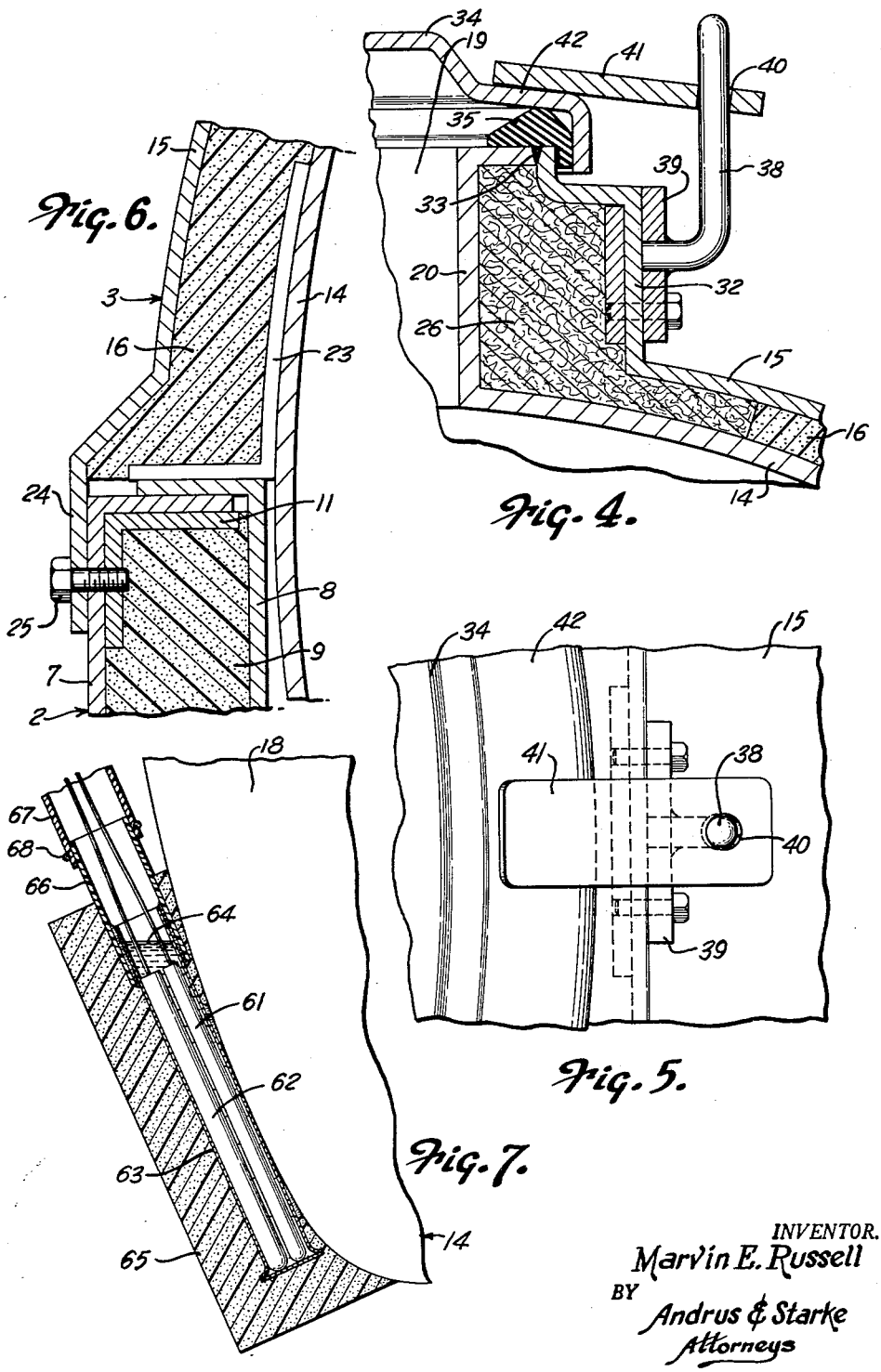

United States Patent Office 3,120,110
Patented Feb. 4, 1964

3,120,110
VACUUM MILK COOLER
Marvin E. Russell, Hartford, Wis., assignor to Dairy Equipment Company, Madison, Wis., a corporation of Wisconsin
Filed Oct. 11, 1961, Ser. No. 144,381
19 Claims. (Cl. 62—185)

This invention relates to a cooling apparatus and more particularly to a vacuum milk cooler in which a cooling media is circulated in heat transfer relation with the external surfaces of the milk container to cool the milk therein.

Vacuum milk coolers are of two general types; the ice bank type and the direct expansion type. In the ice bank type the tank containing the milk to be cooled is partially immersed in a cooling liquid such as water contained within a cabinet or casing. The water is cooled by a refrigerant which is circulated within coils immersed in the water. A layer of ice is built up around each of the cooling coils and the water is circulated in the cabinet to increase the heat transfer between the water and the milk contained within the tank.

In the direct expansion type of milk cooler the cooling coils containing the refrigerant are welded or brazed directly to the tank so that heat transfer takes place directly between the milk within the tank and the refrigerant passing within the coils.

The ice bank type of milk cooler has several advantages over the direct expansion type in that the ice bank type prevents freezing of the milk, for the milk is only in heat transfer relation with the cold water. In the direct expansion type there is a tendency to freeze the milk, for the milk is in direct heat transfer relation with the refrigerant passing within the cooling coils.

In addition, as the ice bank type of milk cooler provides a large source of cooling liquid, it enables warm milk entering the tank to be cooled at a rapid rate. With the direct expansion type it is difficult to get rapid cooling without freezing of the milk as there is a smaller heat transfer surface in contact with the tank.

With the ice bank type, a smaller compressor is required due to the fact that the compressor will run for longer periods to build up a layer of ice on the coils which serves as a storage media because of its latent heat of fusion. As there is no storage of a cooling medium in the direct expansion type, a larger compressor will be required in order to effectively cool the milk as it is being drawn into the tank.

Moreover, in case of a power failure, other cooling media, such as snow or ice, can be put into the cabinet of the ice bank type of cooler to keep the milk cold until the power failure is remedied.

The present invention is directed to an ice bank type vacuum milk cooler which includes a base cabinet containing water or other cooling liquid. The tank to contain the milk is partially immersed within the water and the upper half of the tank is laminated to a cover with a layer of foam plastic bonded to the cover and to the tank. With this construction the tank, cover and insulating layer are an integral unit which can be removed from the base cabinet.

The cooling water is in contact with substantially the entire lower half of the tank and the water is cooled by a series of cooling coils containing a refrigerant. To provide circulation for the cooling water, a pair of circulation rails are disposed within the cabinet adjacent to the tank and beneath the liquid level. The cooling water or liquid is pumped through the circulating rails and discharged in the form of streams extending tangentially to the tank wall to provide circulation of the cooling water within the cabinet.

To control the cooling of the milk, a tube is connected to the outer surface of the tank below the water level and contains a thermometer and a thermostat. The thermometer indicates the temperature on an external dial and the thermostat is connected to the cooling water pump and to the agitator in the milk tank so that when the temperature of the milk falls below the desired temperature setting, the pump and agitator will stop. The thermostat tube contains a liquid such as water and is sealed and insulated from the cooling water in the cabinet. With this construction, both the thermometer and the thermostat are readily removable from the tube and a very accurate control of the temperature of the milk is provided.

The present invention also provides an improved locking mechanism for the manhole cover in the milk tank. To establish a vacuum in the tank, it is initially necessary to seal the manhole cover to the manhole. In accordance with the invention, the flange bordering the manhole is provided with a pair of upstanding pins and a pair of flat wedge plates having openings are merely slipped over the pins and bear against the upper surface of the manhole cover. The openings in the plates wedgingly engage the pins and hold the cover down tightly against the manhole flange to seal the manhole and enable a vacuum to be drawn within the tank.

This locking mechanism is extremely simple and can be very readily cleaned after the milking operation. As sanitary requirements make it necessary for all moving parts in the milking zone to be completely disassembled and cleaned after the milking operation, this locking device, because of its simplicity, greatly facilitates the cleaning operation.

Other objects and advantages will appear in the course of the following description.

The drawings illustrate the best mode presently contemplated of carrying out the invention.

In the drawings:

FIGURE 1 is a longitudinal section of the assembled milk cooler;

FIG. 2 is a transverse section taken along line 2—2 of FIG. 1;

FIG. 3 is an end view of the milk cooler showing the control panel;

FIG. 4 is an enlarged fragmentary section taken along line 4—4 of FIG. 1 and showing the details of the manhole structure and the locking plates;

FIG. 5 is a plan view of a portion of the manhole showing the locking plates;

FIG. 6 is an enlarged fragmentary section showing the joint between the base cabinet and the tank assembly; and FIG. 7 is an enlarged fragmentary section showing the attachment of the thermostatic unit to the tank.

The drawings illustrate a milk cooler 1 comprising a base cabinet 2 and a tank assembly 3 which is mounted on the upper end of the base cabinet.

The base cabinet 2 is generally rectangular in shape with an open top and includes a pair of side walls 4 and a pair of end walls 5 which are connected by a bottom wall 6. Each of the walls is formed of an outer skin 7 and an inner skin 8 which are separated by an intermediate layer of foam plastic 9. The inner and outer skins 7 and 8 are substantially continuous members and are formed of a corrosion resistant material such as stainless steel or the like. The foam plastic material is generally in the form of slabs or planks which are bonded to the surfaces of the skins 7 and 8 by an adhesive. Alternately, liquid foam plastic material may be poured within the space between the skins 7 and 8 to provide the layer of foam insulation 9.

To reinforce the cabinet 2, a lower base angle 10 and an upper angle 11 are secured to the skins 7 and 8 and extend around the cabinet. As best shown in FIG. 6, the upper edges of the skins 7 and 8 are bent toward each other and secured in overlapping relation to enclose the upper edge of the base cabinet. To support the cabinet 2, a series of legs 12 are secured to the bottom wall 6.

An opening is provided in the bottom wall 6, and a rubber stopper 13 is engaged within the opening and supports a stand pipe 13a. The stand pipe extends upwardly to a level slightly below the upper edge of the cabinet and serves to maintain a constant water level in the cabinet. Initially, the cabinet is filled with water up to the top of the stand pipe, and as ice is formed in the cabinet, a portion of the cooling water will overflow into the stand pipe 13a due to the increase in volume caused by the ice formation.

The tank assembly 3 includes a tank 14 which is formed of stainless steel or the like and is adapted to contain the milk to be cooled, and a cover 15 which is bonded to the outer surface of the tank by a layer of foam plastic 16.

The tank 14 includes a cylindrical shell 17 and a pair of generally curved heads 18 which enclose the ends of the shell. While the tank is shown as being generally cylindrical in cross section, it is contemplated that the tank cross section may be any desired shape such as elliptical, oval, square or the like.

To provide access to the interior of the tank, a manhole 19 is provided in the upper portion of the shell 17 and an upstanding flange 20 borders the manhole 19.

Milk is drained from the tank 14 through an outlet pipe 21 which is welded in an opening in the lower portion of one of the heads 18. The outlet pipe 21 extends within an opening in the corresponding end wall 5 of the cabinet and a disc 22 is secured to the pipe and is attached by bolts to a second annular disc 22a located on the outside of the cabinet. A suitable discharge conduit is threadedly engaged with the outer end of pipe 21. The tank 14, as well as cabinet 2, is tilted due to the difference in length of legs 12 so that the milk will drain from pipe 21.

The tank assembly 3 is supported on the upper edge of the base cabinet 2 by a series of straps 23 which are secured to the outer surface of the tank and have outwardly extending legs which rest on the upper edge of the cabinet. The cover 15 is provided with a downwardly extending skirt or edge 24 which extends downwardly beyond the legs of the straps and is secured to the outer skin 8 of the cabinet by a series of bolts, as best shown in FIG. 6.

The foam plastic layer 16 is bonded to both the tank 14 and cover 15 so that the tank assembly 3 is an integral unit which can be readily removed from the cabinet 2.

The foam plastic material 16 may be any of the conventional closed cell type foam materials such as polyurethane or the like and extends substantially continuously between the shell 17 of the tank and the cover 15 as well as around the upper portions of the heads 18 of the tank. At the high end of the tank (the right hand end as viewed in FIG. 1), the end of the foam plastic layer 16 is spaced from the corresponding end surface of the cover 15 to provide a space for the circulating pump, as hereinafter described.

As best shown in FIG. 2, the layer of foam material terminates on either side of the longitudinal centerline of the tank 14 and a layer of glass fiber insulation 26 is disposed between the cover and the tank 14 in this area. The layer of glass fiber 26 extends substantially the length of the tank and borders the manhole flange 20. The glass fiber insulation 26 is substituted for the foam plastic 16 in the upper area of the tank because it has been found necessary in some instances to weld lugs or other elements to the cover at this area. The foam plastic tends to generate gas when heated by the welding with the result that the welds are not sound. Therefore the layer of glass fiber, or other fibrous material which will not decompose at welding temperatures, is located in the space between the tank and the cover on either side of the longitudinal centerline of the tank to permit welding in this area.

To agitate the milk within the tank 14, an agitator 27 is mounted on the cover 15 and is provided with a shaft 28 which extends downwardly in sealed relation through a flanged opening in the tank 14. A suitable paddle 29 is secured to the lower end of the shaft and serves to slowly circulate the milk within the tank.

The agitator 27 is driven by a motor 30 which is mounted on a support plate 31 secured to the upper surface of the tank 14 beneath the cover 15.

As best shown in FIG. 4, the cover 15 is provided with an upstanding flange 32 which borders the manhole flange 20 and the edges of the flanges 20 and 32 are welded as indicated at 33. A cover 34 encloses the manhole 19 and an annular gasket 35 is disposed around the manhole and serves to seal the same.

A vacuum line 36 and a milk line 37 are secured in sealed relation within openings in the manhole cover 34. The vacuum line 36 is connected to a suitable source of vacuum which serves to evacuate or reduce the pressure within the tank 14, and the milk line 37 is connected to a suitable milking apparatus. By drawing a vacuum through line 36, a vacuum is established within tank 14 and milk line 37.

In order to seal the cover 34 against the manhole flange 20 to enable the vacuum to be initially drawn within the tank 14, a cover locking mechanism is employed. The cover locking mechanism includes a pair of generally L-shaped pins 38. The lower end of each pin is welded to a bracket 39 secured to the flange 32 of the cover 15. The upwardly extending end of each pin 38 is wedgingly secured within an opening 40 in a wedge plate 41. The inner end of the wedge plate 41 is adapted to bear against the flange 42 on cover 34 and hold the gasket 35 in sealing engagement with the flange 20 bordering the manhole 19. The wedge plates 41 are an extremely simple and effective means for locking the cover to the manhole opening when drawing the vacuum. As sanitary standards require all mechanism located in the milk zone to be thoroughly sanitized after each milking operation, the use of the wedge plates 41 greatly simplifies the cleaning and sanitizing operation. As no moving elements are employed in the locking device, the wedge plates need only be removed from the pins for cleaning.

As the pressure is reduced within the tank 14, the pressure differential between the interior and exterior of the tank will cause the cover to compress the gasket 35. The wedge plates 41 will tend to take up this compression and thereby maintain the cover in tight sealing engagement with the manhole flange 20.

The base cabinet 2 contains a cooling liquid 43 such as water which substantially fills the cabinet and contacts the lower half of the tank 14.

To circulate the water within the cabinet and provide a better heat transfer between the water and the milk within the tank, a pair of longitudinal rails 44 are secured to the tank shell 17 and the corresponding ends of the rails 44 are connected by a transverse rail 45 which is secured to the head 18 of the tank. The rails 44 and 45 are provided with a plurality of outlet openings 46 which direct the water outwardly and generally tangentially to the outer surface of the tank 14. The flow of water through the outlet openings 46 serves to circulate the water within the cabinet and thereby increases the rate of heat transfer from the milk to the cooling liquid.

Water or other cooling liquid is introduced into the cooling rails 44 through conduits 47 which are connected to the outlets of a double outlet pump 48. The pump 48, which is located adjacent the bottom wall 6 of the base cabinet, is driven by a motor 49 which is mounted on brackets 50 and 51 secured to the end wall 5 of the cabinet. One of the end brackets 50 has a shorter length than the bracket 51 to enable the pump and motor unit to be more easily removed from the cabinet when the tank assembly 3 is secured to the cabinet 2.

Operation of the pump 48 by motor 49 draws cooling liquid from the base cabinet 2 and pumps the same through conduits 47 and rails 44 and 45. The cooling water is then directed outwardly and tangentially of the tank through openings 46 to provide circulation for the water and an increased rate of heat transfer.

The water within the cabinet 2 is cooled by a refrigerant flowing within a series of cooling coils 52 which are located within the base cabinet 2 beneath the water level. An inlet section 53 is connected to the coil 52 and serves to introduce the refrigerant to the coils from a compressor, not shown, while the other end of the coil is connected to an outlet section 54 which returns the refrigerant liquid to the compressor. The inlet section 53 and outlet section 54 pass outwardly through openings in a control panel 55 associated with an end of the cover 15.

The coil 52 is supported within the base cabinet 2 by a pair of frames 56 which extend transversely of the cabinet and support the coils in spaced relation. The frames 56 are supported by means of straps 57 which extend upwardly along the side walls 4 and are connected to the upper edge of the base cabinet 2.

A conventional expansion valve 58 is connected in the inlet section 53 and a thermal element 59 for the expansion valve is connected in the outlet section 54 and is operably connected to the expansion valve. The thermal element 59 senses the super heat of the refrigerant vapor and actuates the expansion valve to insure that only refrigerant vapor is returning to the compressor through line 54.

In addition, an ice bank control 60 is associated with the coils 52 and is operably connected with the compressor. The ice bank control controls the thickness of the ice developed on the coils 52 and when the ice bank builds up beyond a predetermined limit, the ice bank control 60 operates to shut off the compressor.

To control the cooling rate of the milk within the tank 14, a thermostat 61 and thermometer 62 are disposed within a tube 63 secured by soldering to the outer surface of the head 18 of the tank 14. The tube 63 contains a heat transfer fluid 64 such as water and a layer of foam plastic insulation 65 is disposed around the tube 63 so as to insulate the water 64 from the cooling liquid 43. The thermostat 61 and thermometer 63 are freely movable within the tube 63 and due to the layer of insulation 65, the water 64 is at substantially the same temperature as the milk within the tank 14.

The upper end of the metal tube 63 is cemented or otherwise secured to a plastic tube 66 and tube 66 is connected to a tube 67 leading to panel 55 by a split ring clamp 68.

The thermometer 62 is connected to a thermometer dial 69 located on the control panel 55 and indicates the temperature of the water 64 and thus the temperature of the milk within the tank 14. The thermostat 61 is connected electrically to the agitator 27 and the pump 48 so that when the temperature of the milk is reduced beyond a predetermined setting, the agitator and pump will stop.

The thermostat 61 and thermometer 62 are located beneath the level of the cooling liquid 43 and are disposed in insulated, sealed relation to the cooling liquid 43. The thermometer and thermostat are freely removable within the tube 63 and may be removed or replaced by lowering the level of the cooling liquid 43, disconnecting the split ring clamp 68 and withdrawing the thermostat or thermometer.

The control panel 55 also contains an opening 70 for the entry of the electrical conduits to the pump motor 49 and a switch 71 is located on the control panel for turning on power to the apparatus.

The vacuum milk cooler of the invention circulates cooling liquid in contact with substantially the entire bottom half of the tank to thereby efficiently cool the milk within the tank. As the milk within the tank is in heat transfer relation with the cooling liquid and not with the refrigerant liquid, freezing of the milk is prevented.

The spray rails 44 and 45 which direct the cooling liquid outwardly away from the tank and generally tangentially thereto provide good circulation for the cooling liquid and thereby provide an improved heat transfer between the milk within the tank and the cooling liquid.

The cover 15, being formed integrally with the milk tank 14, enables the unit to be more easily serviced in the field. The entire tank assembly 3, including the cooling coils, can be withdrawn from the cabinet 2 to thereby readily service the coils or other components of the cooler which are located in the cabinet.

The wedging plates 41 and pins 38, which serve to hold the manhole cover 34 down tightly on the manhole flange while drawing a vacuum within the tank, are of simple construction and can be readily cleaned after the milking operation.

Various modes of carrying out the invention are contemplated as being within the scope of the following claims particularly pointing out and distinctly claiming the subject matter regarded as the invention.

I claim:

1. An apparatus for cooling a perishable liquid, comprising a bulk tank to contain the perishable liquid to be cooled, a first conduit communicating with the tank for supplying the perishable liquid to the tank, a second conduit communicating between the tank and a source of vacuum to establish a vacuum within the tank and thereby draw the perishable liquid into the tank through said first conduit, a container containing a cooling liquid and having an open upper end, said cooling liquid substantially filling said container, means for circulating the cooling liquid within the container, a cover spaced outwardly from the upper portion of the tank and the lower portion of the tank being disposed within the container in heat transfer relation with the cooling liquid therein, a layer of foam plastic material disposed within the space between the tank and cover and bonded to the outer surface of the tank and to the inner surface of the cover to provide an integral tank unit, and means connected to the tank for supporting the tank unit on the container.

2. A vacuum milk cooler, comprising a tank to contain the milk to be cooled, a milk conduit connected to the tank for introducing milk to the tank, a vacuum conduit connected to the tank for establishing a vacuum in the tank, a cabinet to contain a heat transfer liquid and having an open upper end, conduit means disposed within the cabinet and containing a refrigerant for cooling the heat transfer liquid, said tank having a generally horizontal axis and including a shell and a head enclosing each end of the shell, a layer of foam plastic bonded to the upper portion of the shell and heads with the lower portion of the shell and heads being exposed and being located within the container in contact with the heat transfer liquid therein, an outer casing bonded to the foam plastic and disposed outwardly of the upper portion of the shell and heads, said tank, foam plastic and outer casing being an integral unit, and means for supporting said unit on the cabinet.

3. In an apparatus for cooling milk, a generally rectangular container containing a cooling liquid and having an open upper end, a tank to contain milk to be cooled and having a generally horizontal axis and including a generally cylindrical shell and a head enclosing each end of the shell, the lower portion of the tank being disposed within the container in heat transfer relation with the cooling liquid, a cover enclosing the open end of the container and including a generally curved portion spaced outwardly from the shell of the tank and including end surfaces spaced from the heads of the tank, a layer of foam plastic material disposed within the space between the curved portion of the cover and the shell of the tank and disposed between the heads of the tank and said end surfaces, a plurality of lugs extending outwardly from the tank and supported on the upper edge of the container, and a skirt associated with the cover and extending downwardly beyond the lugs in lapping relation to the walls of the container.

4. A cooling apparatus for cooling milk, comprising a container having an open upper end, a tank to contain the milk to be cooled and having the lower portion thereof disposed within the container, a body of cooling liquid disposed within the container and substantially filling the same and disposed in direct heat transfer relation with approximately the lower half of the tank, a cover enclosing the upper end of the container and spaced from the upper portion of the tank to provide a clearance therebetween, a layer of foam plastic material disposed within the clearance and bonded to the outer surface of said upper portion of the tank and bonded to the inner surface of the cover to provide an integral tank assembly, and means for removably securing the tank assembly to the container.

5. A cooling apparatus for cooling milk, comprising a container having an open upper end, a tank to contain the milk to be cooled and having the lower portion thereof disposed within the container, a body of cooling liquid disposed within the container and substantially filling the same and disposed in direct heat transfer relation with approximately the lower half of the tank, a conduit immersed within the cooling liquid and having a series of openings directed outwardly away from the tank, means for circulating the cooling liquid through the conduit and discharging said cooling liquid through the openings to thereby provide a circulation of the cooling liquid within the container, and refrigerating means disposed within the container in heat transfer relation with the cooling liquid to cool the same.

6. A vacuum milk cooler, comprising a cabinet containing a cooling liquid and having an open upper end, a tank to contain milk to be cooled and having a lower portion thereof disposed within the container in heat transfer relation with the cooling liquid, refrigerating means disposed within the cabinet for cooling the cooling liquid therein, a circulation tube having a plurality of outlet openings therein and disposed adjacent the tank and located at a level beneath the uppermost portion of said refrigerating means, and pumping means for circulating a portion of the cooling liquid through the tube and discharging the same from the openings into contact with the remaining portion of the cooling liquid contained within the cabinet to thereby provide a circulation of the cooling liquid within the cabinet.

7. The structure of claim 6 in which the openings in the tube are directed generally tangentially of the tank.

8. A vacuum milk cooler comprising a tank to contain the milk to be cooled, a milk conduit connected to the tank for introducing milk to the tank, a vacuum conduit connected to the tank for establishing a vacuum in the tank, a container to contain a liquid and having an open upper end, said liquid substantially filling said container, refrigerating means disposed within the container in heat transfer relation with the heat transfer liquid to cool the liquid, said tank having a generally horizontal axis and including a tubular shell and a head enclosing each end of the shell, a pair of longitudinal rails secured to the bottom portion of the shell and straddling a vertical plane passing through the axis of the shell, a transverse rail connecting the longitudinal rails and disposed adjacent one of said heads, said longitudinal rails and transverse rail being located beneath the level of liquid in said container and having a series of openings facing generally tangentially of the adjacent tank surfaces, and means for circulating the liquid through said rails whereby said liquid is discharged from said openings and beneath the level of the liquid in said container to provide circulation of said liquid within the container.

9. A cooling apparatus for cooling milk, comprising a container having an open upper end, a tank to contain the milk to be cooled and having the lower portion thereof disposed within the container, a cooling liquid disposed within the container and substantially filling the same and disposed in direct heat transfer relation with approximately the lower half of the tank, a cover enclosing the upper end of the container and spaced from the upper portion of the tank to provide a clearance therebetween, a layer of foam plastic material disposed within the clearance and bonded to the outer surface of said upper portion of the tank and bonded to the inner surface of the cover to provide an integral tank assembly, means for removably securing the tank assembly to the container, a conduit immersed within the cooling liquid and having a series of openings therein, means for circulating the cooling liquid through the conduit and discharging said cooling liquid through the openings to thereby provide a circulation of the cooling liquid within the container, and refrigerating means disposed within the container in heat transfer relation with the cooling liquid to cool the same.

10. The structure of claim 6 in which the refrigerating means includes a series of coils disposed longitudinally within the cabinet in spaced relation to the tank, and a frame connected to the walls of the container for supporting the coils within the cabinet.

11. In a vacuum milk cooler, a cabinet containing a cooling liquid and having an open upper end, a tank to contain milk to be cooled and having the lower portion thereof disposed within the cabinet in heat transfer relation with the cooling liquid, a tube secured to the wall of the tank in direct heat transfer relation with the tank and disposed beneath the level of the cooling liquid, a heat transfer liquid disposed within the tube, temperature control means freely disposed within the tube, means for sealing the tube to prevent contact between the heat transfer liquid and the cooling liquid within the cabinet, and means for connecting the temperature control means to a temperature control device.

12. The structure of claim 11, and including a layer of insulating material disposed around the tube to prevent heat transfer from the cooling liquid to the heat transfer liquid within the tube.

13. In a vacuum milk cooler, a cabinet containing a cooling liquid and having an open upper end, a tank to contain milk to be cooled and having the lower portion thereof disposed within the cabinet in heat transfer relation with the cooling liquid, a tube secured to the wall of the tank in direct heat transfer relation therewith and disposed beneath the level of the cooling liquid, a heat transfer liquid disposed within the tube, thermostatic means freely disposed within the tube and immersed in said heat transfer liquid and responsive to the temperature of the heat transfer liquid, means for sealing the tube to prevent contact between the heat transfer liquid and the cooling liquid within the cabinet, pump means for circulating the cooling liquid within the cabinet, and means operatively connecting the thermostatic means and the pump means for operating the pump means when the temperature of said heat transfer liquid rises above a predetermined value.

14. A cooling apparatus for cooling a perishable liquid, comprising a container containing a cooling liquid and having an open upper end, a tank to contain a perishable liquid to be cooled and having the lower portion thereof disposed within the container in heat transfer relation with the cooling liquid, said tank having a manhole in the upper portion thereof, a cover enclosing the upper end of the container and spaced from the upper portion of the tank to provide a clearance therebetween, said cover having an opening therein disposed in alignment with the manhole in the tank, a layer of fibrous insulation disposed within the clearance and bordering said manhole, said insulation being characterized by the ability to withstand decomposition at welding temperatures, a layer of foam plastic disposed within the remaining portion of said clearance and bonded to the inner surface of the cover to provide an integral tank assembly, and means for removably securing the tank assembly to the container.

15. The structure of claim 14, in which the layer of fibrous insulation is composed of glass fibers and said layer extends substantially the length of the tank.

16. In a vacuum milk cooler, a tank assembly including a tank to contain milk to be cooled and having an opening therein, a cover to removably enclose the opening in the tank, means for establishing a vacuum in the tank, a pin connected to the tank assembly adjacent the opening in the tank, and a locking member having an opening to freely receive said pin and having a portion disposed in bearing engagement with the cover to maintain the cover in sealing relation with the opening in the tank to permit establishment of a vacuum in the tank.

17. In a vacuum milk cooler, a tank assembly including a tank to contain milk to be cooled and having an open therein, a cover to removably enclose the opening in the tank, means for establishing a vacuum in the tank, a plurality of pins connected to the tank assembly in spaced relation around the opening in the tank and extending outwardly of the tank, and a locking member for each pin and having a hole to wedgingly receive the respective pin, each of said locking members having a portion extending over said opening and disposed in bearing engagement with the outer surface of said cover to hold the cover in sealed relation with respect to said opening.

18. The structure of claim 17, in which the pins extend outwardly in a direction substantially parallel to the axis of the opening in the manhole and said pins have a substantially uniform cross sectional area throughout their length.

19. A cooling apparatus for cooling a perishable liquid, comprising a container containing a cooling liquid and having an open upper end, a tank to contain a perishable liquid to be cooled and having the lower portion thereof disposed within the container in heat transfer relation with the cooling liquid, said tank having a manhole in the upper portion thereof, a cover enclosing the upper end of the container and spaced from the upper portion of the tank to provide a clearance therebetween, said cover having an opening therein disposed in alignment with the manhole in the tank, a plurality of connecting members connected to said cover and spaced around the manhole, the outer portion of each connecting member being substantially straight and extending generally parallel to the axis of the manhole, a lid to enclose the manhole, a locking plate freely engageable with each connecting member, each locking plate having a hole to freely receive the outer portion of the respective connecting member and each locking plate having a portion extending over the manhole and disposed in bearing engagement with the lid to seal the lid to the manhole, a layer of foam plastic material disposed within the clearance and bonded to the outer surface of said upper portion of the tank and bonded to the inner surface of the cover to provide an integral tank assembly, and means for removably securing the tank assembly to the container.

References Cited in the file of this patent

UNITED STATES PATENTS

| | | |
|---|---|---|
| 2,552,641 | Morrison | May 15, 1951 |
| 2,690,061 | Markley | Sept. 28, 1954 |
| 2,702,205 | Germain | Feb. 15, 1955 |
| 2,713,251 | Cann | July 19, 1955 |
| 2,824,431 | Pearson | Feb. 25, 1958 |
| 2,824,432 | Varese | Feb. 25, 1958 |
| 2,865,391 | Duncan | Dec. 23, 1958 |
| 3,013,402 | Brooker | Dec. 19, 1961 |